Sept. 19, 1939. J. W. WHITE 2,173,601
BRAKE
Filed July 15, 1937
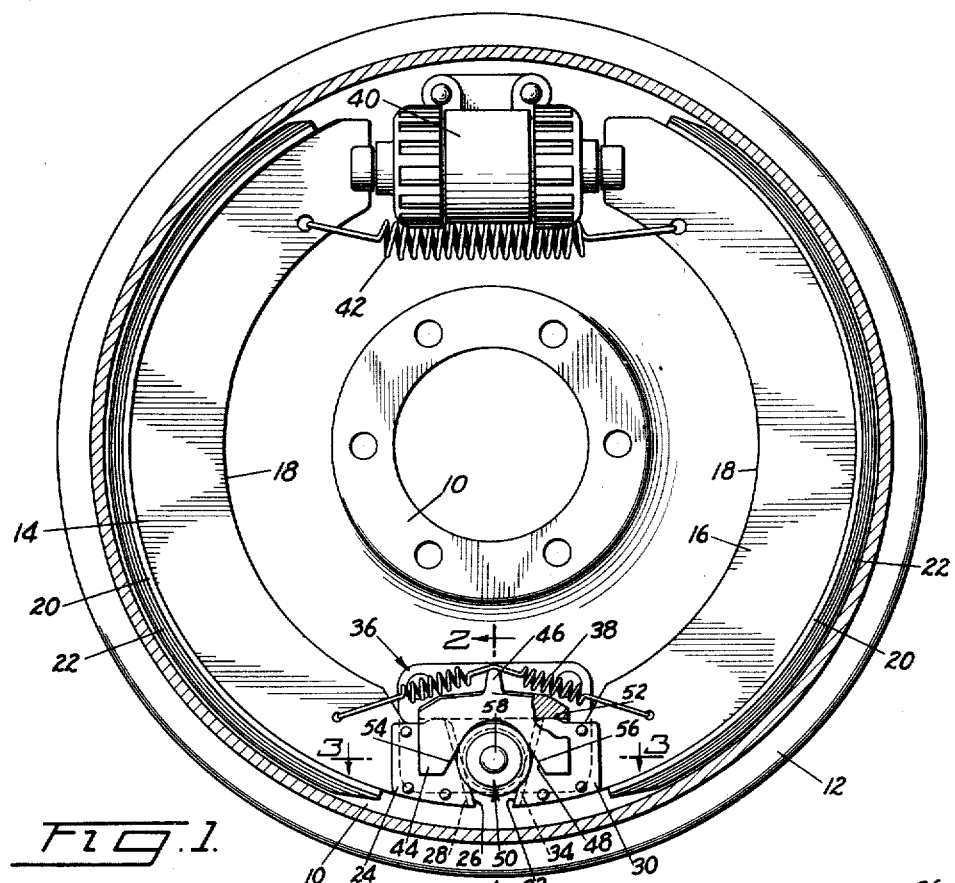
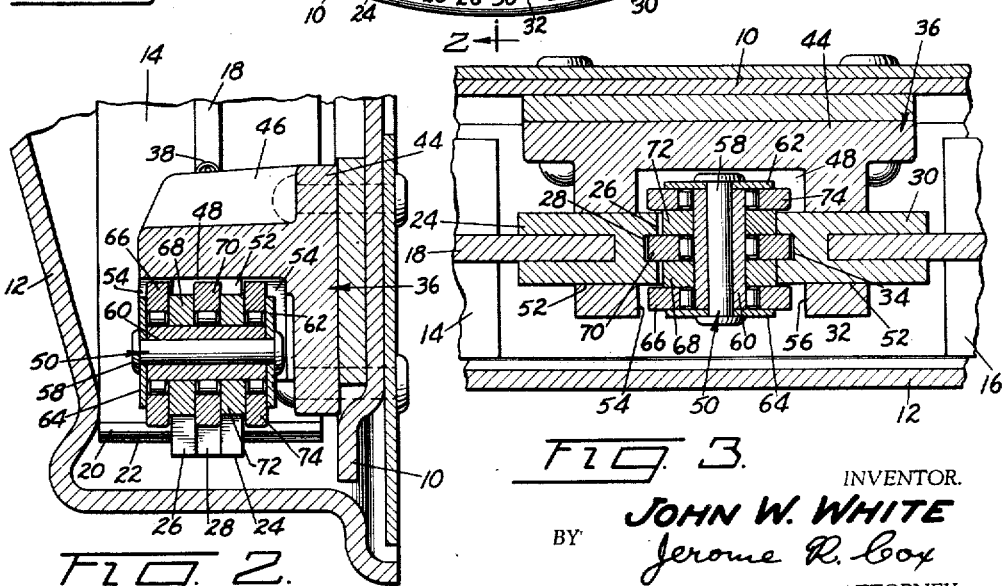
INVENTOR.
JOHN W. WHITE
BY Jerome R. Cox
ATTORNEY.

Patented Sept. 19, 1939

2,173,601

UNITED STATES PATENT OFFICE 2,173,601

BRAKE

John William White, South Bend, Ind., assignor to Bendix Products Corporation, South Bend, Ind., a corporation of Delaware Application July 15, 1937, Serial No. 153,751

4 Claims. (Cl. 188—78)

This invention relates to brakes, and more particularly to internal expanding brakes.

An object of the invention is to provide a brake structure wherein the torque developed in the primary shoe is so resolved that the secondary shoe may be applied with force equal to that of the primary shoe.

Another object of the invention is to provide means whereby forces may be resolved through an anti-frictional roller assembly so as to balance the effectiveness of a primary braking shoe and a secondary braking shoe.

Another object of the invention is to provide means whereby the amount of servo action between a primary braking shoe and a secondary braking shoe may be controlled by changing the angles of the shoe ends and anchor brackets.

A further object of the invention is to provide means whereby equal force may be applied to both shoes so that the efficiency of the brakes may be greatly enhanced, and also that they may be equalized and balanced to the end that the life of the linings may be prolonged.

A further object of the invention is to provide means for applying both shoes of a brake with equal force so as to avoid distortion of the drum and backing plate.

A further object of the invention is to provide a brake structure wherein the pedal travel necessary to actuate the brake may be reduced to a minimum.

Yet a further object of the invention is to provide a brake structure including a primary braking shoe and a secondary braking shoe, and means connecting the shoes so that the articulate ends of the shoes may move into engagement with the drum.

Yet a further object of the invention is to provide a brake structure of a modified servoaction type in which the amount of actuation received by the secondary shoe is equal to that received by the primary shoe, and the anchor takes the balance of the pressure.

Other objects and advantages of the invention will appear from the following description taken in connection with the drawing forming a part of this specification, and in which—

Fig. 1 is a vertical sectional view taken just back of the head of the drum illustrating the invention as applied;

Fig. 2 is a sectional view substantially on line 2—2, Fig. 1; and

Fig. 3 is a sectional view substantially on line 3—3, Fig. 1.

Referring to the drawing for more specific details of the invention, 10 represents a fixed support or backing plate having associated therewith a rotatable drum 12. A pair of corresponding interchangeable friction elements or shoes 14 and 16 are mounted on the backing plate for cooperation with the drum. As shown, the shoes are of conventional type each including a web 18 supporting a rim 20 having secured thereto a lining 22.

The articulate end of the shoe 14 has secured thereto a wear block 24 having an inclined face 26 provided with a slot 28; and, correspondingly, the articulate end of the shoe 16 has secured thereto a wear block 30 having an inclined face 32 provided with a slot 34; and the inclined faces of the wear blocks are arranged in oppositely disposed relation to one another.

An anchor 36 suitably mounted on the backing plate receives the articulate ends of the shoes, and a sectionalized spring 38 connecting the shoes adjacent the articulate ends serves to retain the wear blocks in engagement with the anchors, also to centralize the shoes and to retract the shoes upon completion of a braking operation.

A fluid pressure actuated motor 40 of conventional type, suitably mounted on the braking plate and connected to the force applying ends of the shoes, is operative to actuate the shoes into engagement with the drum against the resistance of a retractile spring 42 connecting the shoes adjacent their force applying ends.

The anchor 36 constitutes a very important factor of the instant invention. As shown, the anchor includes a bracket 44 riveted or otherwise secured to the backing plate 10. This bracket has a lug 46 providing a centralized support for the sectionalized spring 38. The bracket also has a pocket 48 for the reception of a roller assembly 50, and it is transversely slotted as at 52 for the reception of the wear blocks 24 and 30 of the articulate ends of the shoes. The oppositely disposed surfaces defining the pocket are inclined as at 54 and 56, and these inclined surfaces are in reverse of the inclined faces 26 and 32 of the wear blocks 24 and 30.

The roller assembly 50 includes a pintle 58 having thereon a sleeve 60 arranged intermediate corresponding washers 62 and 64, and mounted on the sleeve between the washers are a plurality of rollers 66, 68, 70, 72 and 74. The rollers 66, 70, and 74 are anti-friction rollers. These rollers are spaced apart by the rollers 68 and 72, and have a greater diameter than the rollers 68 and 72. The rollers 66 and 74 travel on the inclined surfaces 54 and 56 of the anchor. The rollers 68 and 72 engage the inclined face 32 of the wear block 34 secured to the articulate end of the shoe 16, and the roller 70 is received by the slot 28 in the inclined face 26 on the wear block secured to the articulate end of the shoe 14.

In a normal operation, upon actuation of the motor 40, the shoes 14 and 16 are moved into engagement with the drum 12 against the resistance of the retractile spring 42. When the shoes engage the drum 12, the resolution of forces is such that the rollers 66, 70, and 74 in the roller assembly 50 resolve the torque against one or the other of the wear blocks 24 and 30 on the articulate ends of the shoes 14 and 16 depending upon the direction of rotation of the drum, and also against one or the other of the inclined surfaces 54 and 56, resulting in travel of the roller on the inclined surface toward the drum and thus applying the secondary shoe until the resistance is balanced.

Because of the roller assembly 50, it is possible to accurately measure or meter the forces to their respective units. The amount of actuation received by the secondary shoe is equal to that received by the primary shoe, and the anchor takes the balance of pressure. Due to the inclined faces 26 and 32 of the wear blocks, the shoes move apart at their articulate ends and hence materially reduce pedal travel.

For example, assume that the drum is rotating in a clockwise direction. Applying pressure from the cylinders 40 on the upper end of the shoe 16 will move that shoe into drum contact and rotation of the drum will move the lower end of the shoe also clockwise, thus exerting force on the roller assembly 50. The force acting on the roller 50 will cause it to contact with the cam surface 54 of the bracket 44 and the cam surface will cause the roller to move outward of the drum. Moving outward of the drum the roller 50 cooperates with the inclined faces 26 and 32 of the wear blocks 22 and 30 to separate the shoes and thus decrease the applying movement of the cylinder 40 necessary to move both shoes in drum contact.

Upon conclusion of a braking operation, pressure on the fluid in the motor is released, whereupon the retractile springs 38 and 42 effectively return the shoes 14 and 16 to retracted position, where, due to cooperation between the wear blocks and the anchor aided by the retractile spring 28, the shoes are lifted from the drum and centralized.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A brake comprising a pair of shoes, wear blocks on the articulate ends of the shoes having inclined faces, an anchor between the shoes having a slot receiving the wear blocks and oppositely disposed inclined surfaces, and a moving roller assembly between the inclined faces of the wear blocks and the inclined surfaces of the anchor.

2. A brake comprising a pair of shoes, wear blocks on the articulate ends of the shoes, inclined faces on the blocks converging toward the rims of the shoes, an anchor having a slot receiving the wear blocks and a notch intersecting the slot, and a roller assembly in the notch receiving the inclined surfaces on the shoes.

3. A brake comprising a pair of shoes, wear blocks on the articulate ends of the shoes, inclined faces on the wear blocks converging toward the rim of the shoes, an anchor having a transverse slot receiving the wear blocks and a notch intersecting the slot, surfaces defining the notch diverging outwardly, a roller assembly in the notch receiving the inclined faces on the wear blocks, and a spring connecting the shoes adjacent their articulate ends.

4. A brake comprising a fixed support, a rotatable drum associated therewith, a pair of shoes on the support, wear blocks on the articulate ends of the shoes, inclined faces on the wear blocks converging toward the drum, an anchor having a transverse slot receiving the wear blocks and a notch intersecting the slot, surfaces defining the notch diverging toward the drum, a roller assembly in the notch receiving the inclined faces on the wear blocks and adapted to travel on the inclined surfaces defining the notch, a spring connecting the shoes adjacent their articulate ends, and means for actuating the shoes.

JOHN WILLIAM WHITE.

---

CERTIFICATE OF CORRECTION.

Patent No. 2,173,601.  September 19, 1939.

JOHN WILLIAM WHITE.

It is hereby certified that error appears in the printed specification of the above numbered patent requiring correction as follows: Page 1, second column, line 26, for the word "braking" read --backing--; page 2, second column, line 1, for "spring 28" read --spring 38--; and that the said Letters Patent should be read with this correction therein that the same may conform to the record of the case in the Patent Office.

Signed and sealed this 24th day of December, A. D. 1940.

(Seal)

Henry Van Arsdale,
Acting Commissioner of Patents.

and 72 engage the inclined face 32 of the wear block 34 secured to the articulate end of the shoe 16, and the roller 70 is received by the slot 28 in the inclined face 26 on the wear block secured to the articulate end of the shoe 14.

In a normal operation, upon actuation of the motor 40, the shoes 14 and 16 are moved into engagement with the drum 12 against the resistance of the retractile spring 42. When the shoes engage the drum 12, the resolution of forces is such that the rollers 66, 70, and 74 in the roller assembly 50 resolve the torque against one or the other of the wear blocks 24 and 30 on the articulate ends of the shoes 14 and 16 depending upon the direction of rotation of the drum, and also against one or the other of the inclined surfaces 54 and 56, resulting in travel of the roller on the inclined surface toward the drum and thus applying the secondary shoe until the resistance is balanced.

Because of the roller assembly 50, it is possible to accurately measure or meter the forces to their respective units. The amount of actuation received by the secondary shoe is equal to that received by the primary shoe, and the anchor takes the balance of pressure. Due to the inclined faces 26 and 32 of the wear blocks, the shoes move apart at their articulate ends and hence materially reduce pedal travel.

For example, assume that the drum is rotating in a clockwise direction. Applying pressure from the cylinders 40 on the upper end of the shoe 16 will move that shoe into drum contact and rotation of the drum will move the lower end of the shoe also clockwise, thus exerting force on the roller assembly 50. The force acting on the roller 50 will cause it to contact with the cam surface 54 of the bracket 44 and the cam surface will cause the roller to move outward of the drum. Moving outward of the drum the roller 50 cooperates with the inclined faces 26 and 32 of the wear blocks 22 and 30 to separate the shoes and thus decrease the applying movement of the cylinder 40 necessary to move both shoes in drum contact.

Upon conclusion of a braking operation, pressure on the fluid in the motor is released, whereupon the retractile springs 38 and 42 effectively return the shoes 14 and 16 to retracted position, where, due to cooperation between the wear blocks and the anchor aided by the retractile spring 28, the shoes are lifted from the drum and centralized.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is—

1. A brake comprising a pair of shoes, wear blocks on the articulate ends of the shoes having inclined faces, an anchor between the shoes having a slot receiving the wear blocks and oppositely disposed inclined surfaces, and a moving roller assembly between the inclined faces of the wear blocks and the inclined surfaces of the anchor.

2. A brake comprising a pair of shoes, wear blocks on the articulate ends of the shoes, inclined faces on the blocks converging toward the rims of the shoes, an anchor having a slot receiving the wear blocks and a notch intersecting the slot, and a roller assembly in the notch receiving the inclined surfaces on the shoes.

3. A brake comprising a pair of shoes, wear blocks on the articulate ends of the shoes, inclined faces on the wear blocks converging toward the rim of the shoes, an anchor having a transverse slot receiving the wear blocks and a notch intersecting the slot, surfaces defining the notch diverging outwardly, a roller assembly in the notch receiving the inclined faces on the wear blocks, and a spring connecting the shoes adjacent their articulate ends.

4. A brake comprising a fixed support, a rotatable drum associated therewith, a pair of shoes on the support, wear blocks on the articulate ends of the shoes, inclined faces on the wear blocks converging toward the drum, an anchor having a transverse slot receiving the wear blocks and a notch intersecting the slot, surfaces defining the notch diverging toward the drum, a roller assembly in the notch receiving the inclined faces on the wear blocks and adapted to travel on the inclined surfaces defining the notch, a spring connecting the shoes adjacent their articulate ends, and means for actuating the shoes.

JOHN WILLIAM WHITE.

---

CERTIFICATE OF CORRECTION.

Patent No. 2,173,601.     September 19, 1939.

JOHN WILLIAM WHITE.

It is hereby certified that error appears in the printed specification of the above numbered patent requiring correction as follows: Page 1, second column, line 26, for the word "braking" read --backing--; page 2, second column, line 1, for "spring 28" read --spring 38--; and that the said Letters Patent should be read with this correction therein that the same may conform to the record of the case in the Patent Office.

Signed and sealed this 24th day of December, A. D. 1940.

(Seal)     Henry Van Arsdale,
Acting Commissioner of Patents.